Dec. 9, 1952  S. R. RINEHART  2,621,040
APPARATUS FOR ASSEMBLING SHEETS OF MATERIAL
Filed Feb. 16, 1950  6 Sheets-Sheet 1
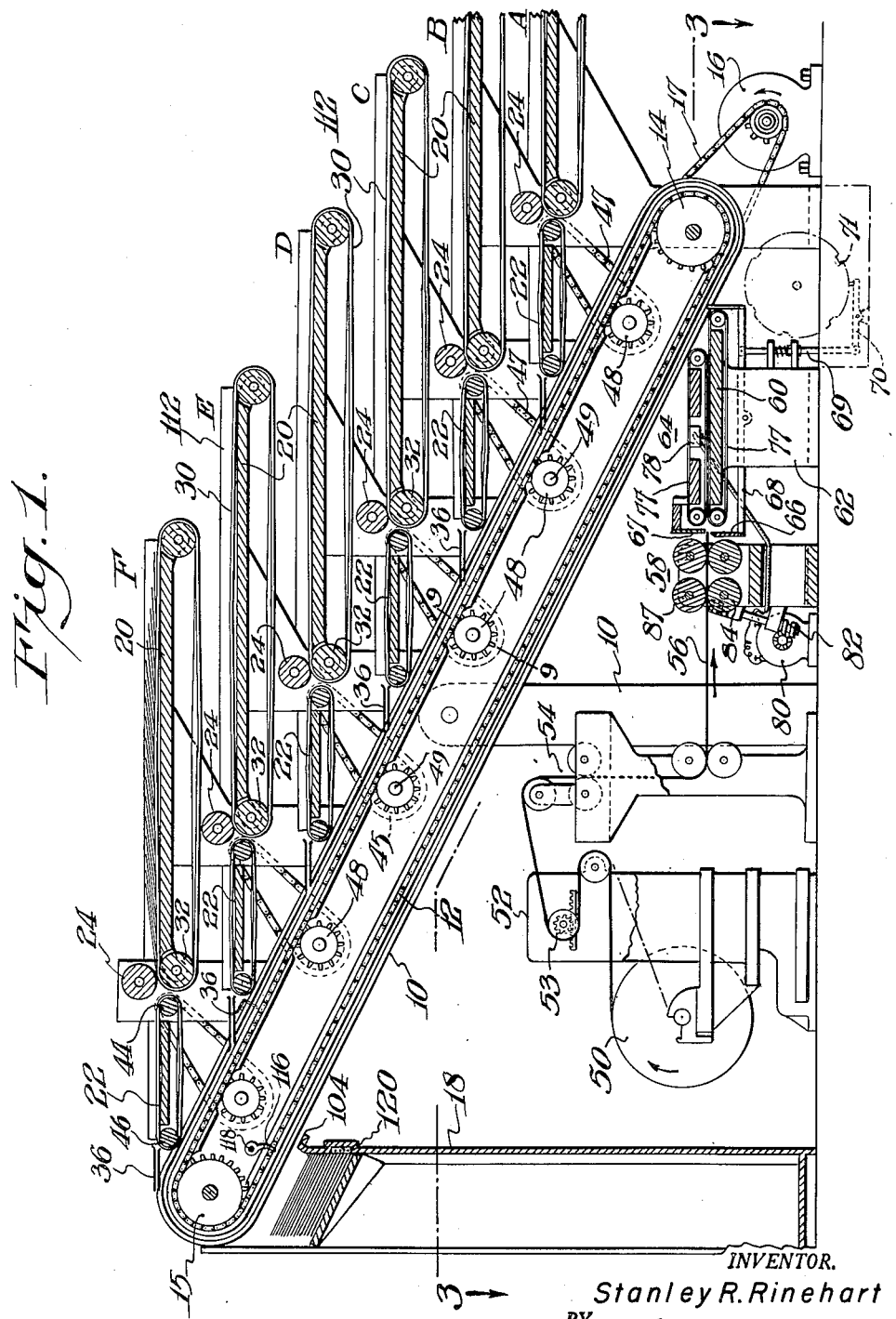
INVENTOR.
Stanley R. Rinehart
BY
ATTORNEY Dec. 9, 1952  S. R. RINEHART  2,621,040
APPARATUS FOR ASSEMBLING SHEETS OF MATERIAL
Filed Feb. 16, 1950  6 Sheets-Sheet 2
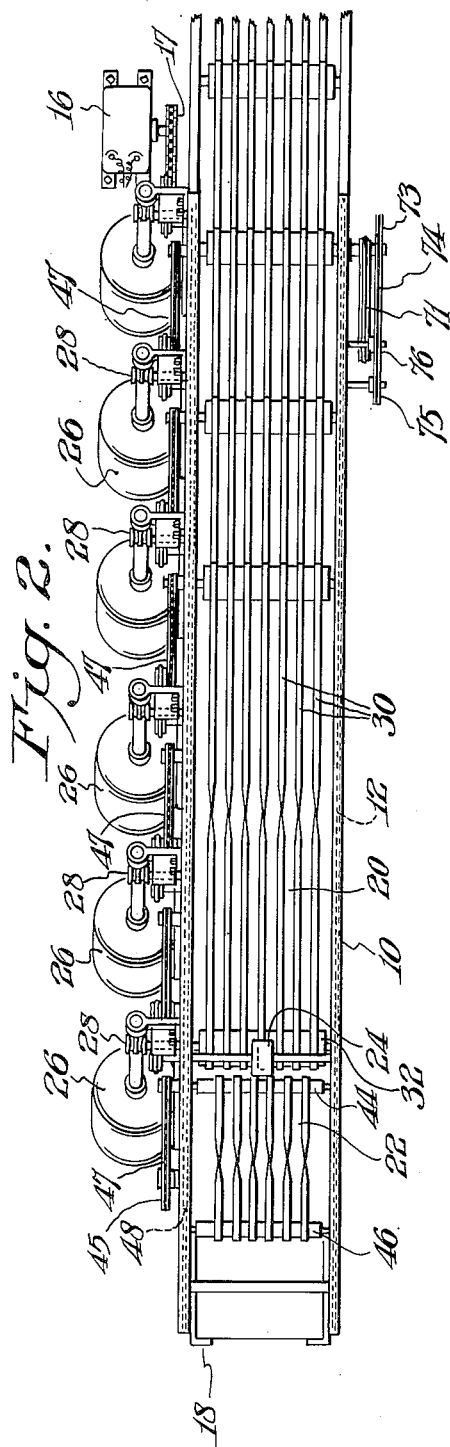
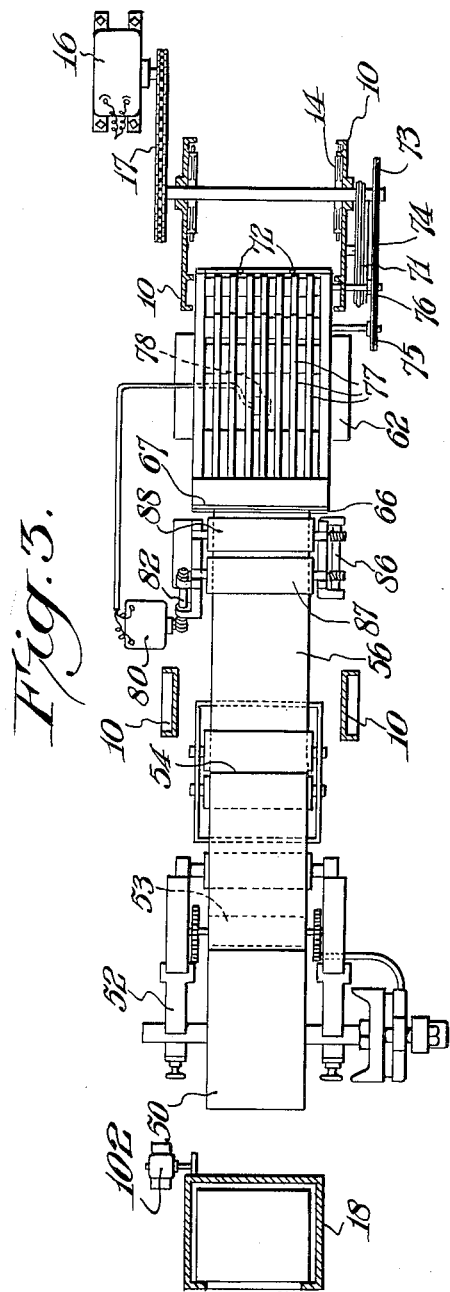
INVENTOR.
Stanley R. Rinehart
BY
ATTORNEY

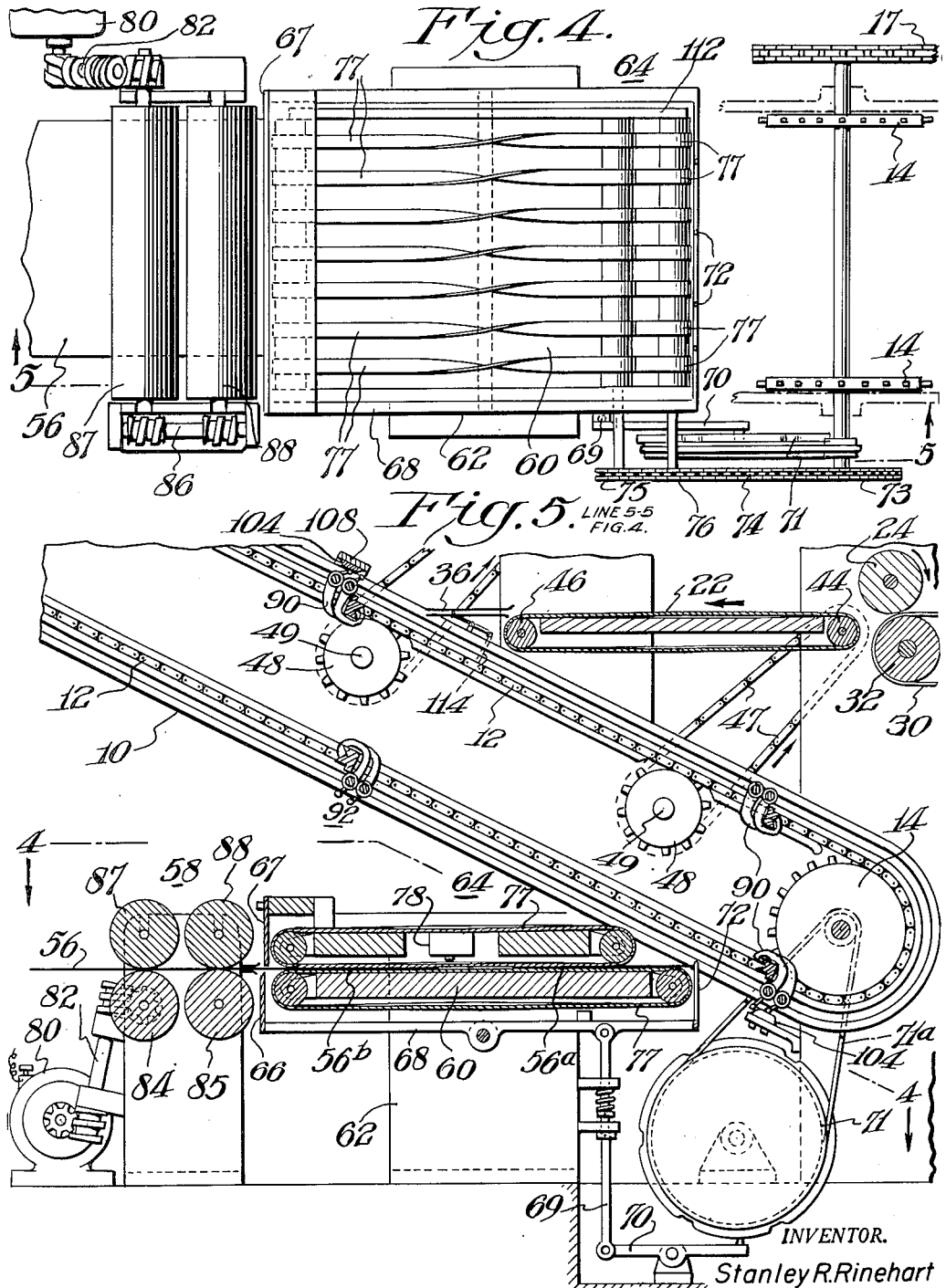

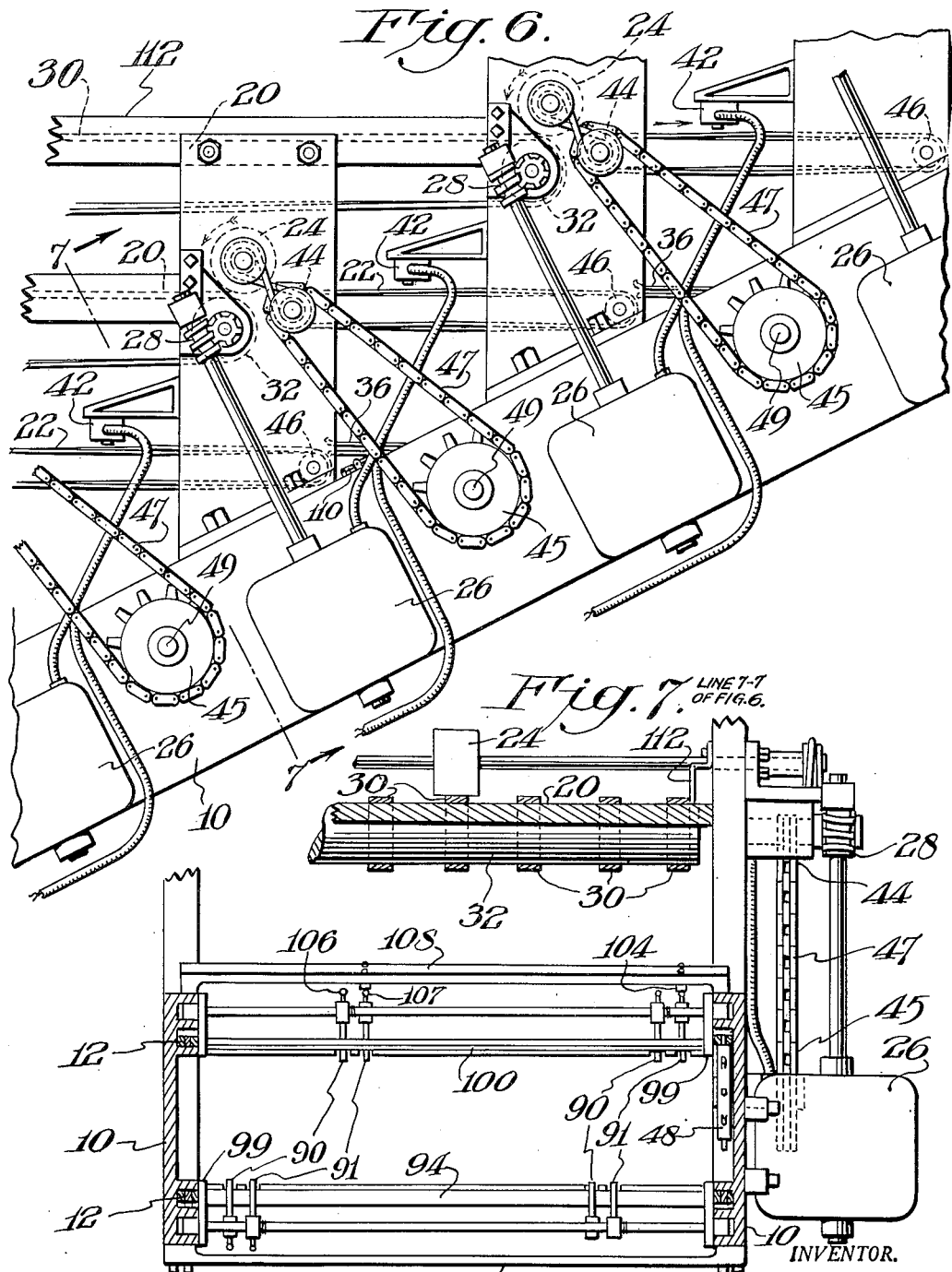

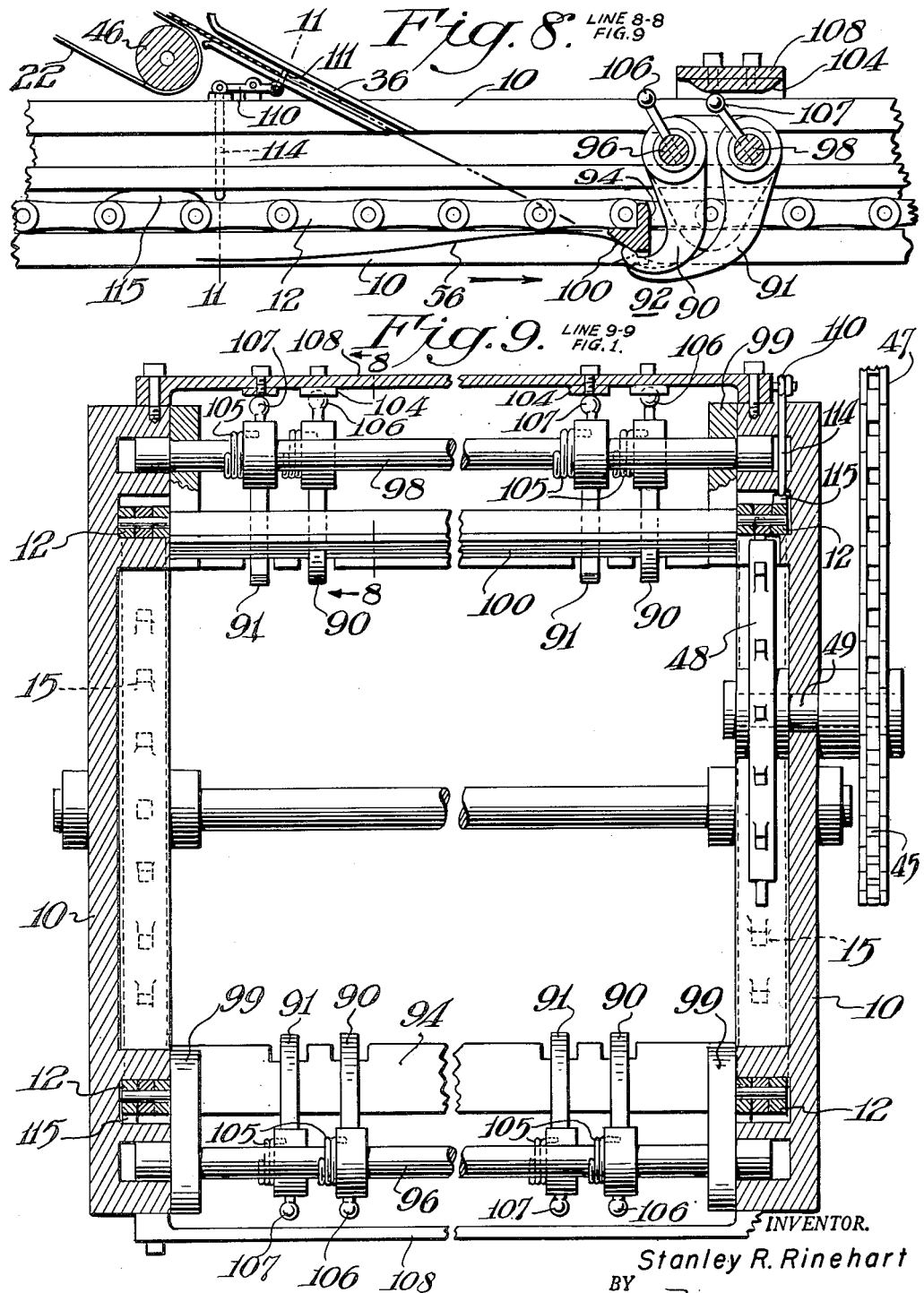

Dec. 9, 1952 S. R. RINEHART 2,621,040
APPARATUS FOR ASSEMBLING SHEETS OF MATERIAL
Filed Feb. 16, 1950 6 Sheets-Sheet 6
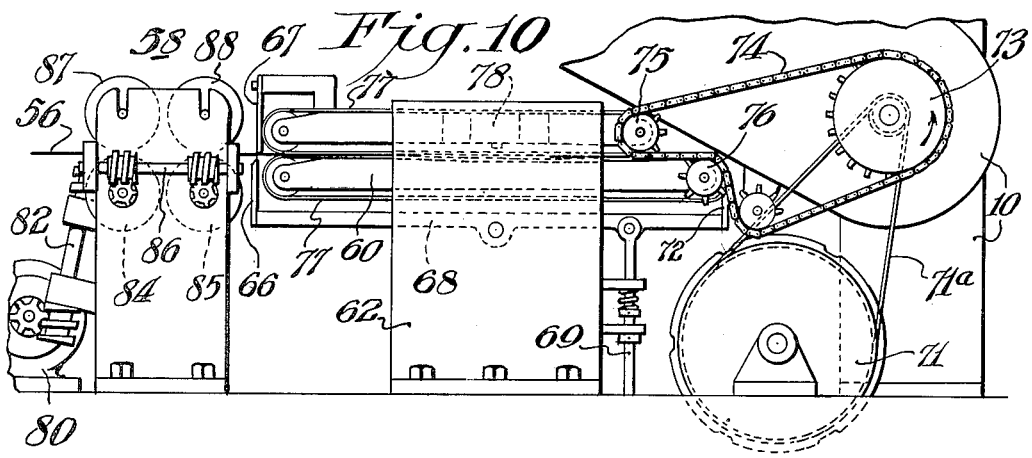
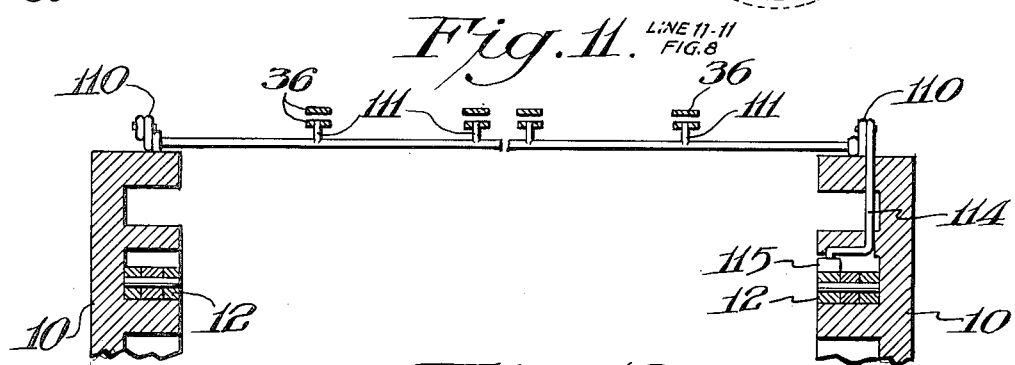
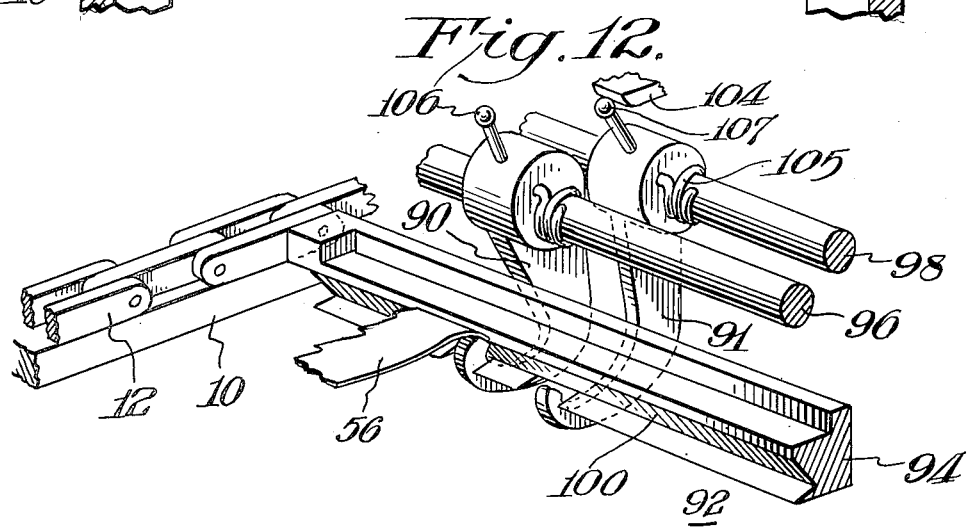
INVENTOR.
Stanley R. Rinehart
BY
ATTORNEY Patented Dec. 9, 1952

2,621,040

UNITED STATES PATENT OFFICE 2,621,040

APPARATUS FOR ASSEMBLING SHEETS OF MATERIAL

Stanley R. Rinehart, Glenside, Pa., assignor to E. I. du Pont de Nemours & Company, Wilmington, Del., a corporation of Delaware Application February 16, 1950, Serial No. 144,564

11 Claims. (Cl. 270—58)

This invention relates in general to a method and apparatus for gathering, collating, or assembling substantially flat sheets of material by a continuous and uninterrupted series of steps and in a dependable and reliable manner from a plurality of individual stations or feeders, or portions of material, from a roll or plurality of rolls into groups such as sets, packets, pads, or signatures. These groups, each consisting of a predetermined number of pieces of material, may be interleaved, fabricated, bound or secured together, and at the same time detached or disengaged from any and all other groups.

Various machines and methods have heretofore been proposed or suggested for collating or otherwise assembling sheets of paper, and particularly printed forms, with sheets of carbon interposed between each two sheets of paper, but such machines or methods have been unsatisfactory for one reason or another in accomplishing the desired steps or objects contemplated by the present invention, or for producing the desired product economically.

A principal object of the invention is to gather or assemble material in a continuous and uninterrupted manner.

Another object of the invention is to gather or assemble material from a plurality of individual stations or feeders.

A further object is to gather or assemble material into sets composed of a predetermined number of sheets.

A still further object of the invention is to gather or assemble sheets of material of predetermined size or dimensions with aligned interleaves.

A still further object of the invention is to reliably assemble and interleave sheets of material in a continuous manner.

A still further object of the invention is to gather or assemble sheets of material in a predetermined order or sequence.

A still further object of the invention is to gather sheets of material in a continuous order into predetermined groups, such as sets or pads, and the like.

Another object of the invention is to gather or assemble sheets of material of predetermined dimensions while interleaving the sheets with sheets of web material severed from a roll.

A still further object of the invention is to take material from a plurality of stations and to feed a single sheet of web material from an initial station between each sheet of material from said stations.

A still further object of the invention is to take sheets of material from individual stations by a conveyor means and interleave the sheets on the conveyor with a web material.

A still further object of the invention is to take sheets of material and drag them along by gripper means on the conveyor.

A still further object of the invention is to apply an adhesive or other coating material to portions of individual sheets, and subsequently form a predetermined number of the sheets into sets or pads, or form book covers and the like.

A particular object of my invention is to provide a conveyor on which gripping means are mounted capable of taking individual sheets of paper or other material from a plurality of stations and dragging or moving them along to a receiving or assembly station, together with provision for taking and assembling therewith sheets cut or severed from web material, such as carbon paper, between alternate sheets taken from the main supply.

These objects are accomplished according to one embodiment of my invention illustrated in the accompanying drawing in which—

Fig. 1 is a central sectional elevation of my improved machine.

Fig. 2 is a plan view of the machine shown in Fig. 1.

Fig. 3 is a sectional plan, taken on line 3—3 of Fig. 1.

Fig. 4 is a plan view on an enlarged scale of the carbon or web sheet feeding mechanism.

Fig. 5 is a sectional elevation of the parts shown in Fig. 4, with the lower end of the conveying mechanism and associated mechanism shown in detail.

Fig. 6 is a fragmentary side elevation showing the separate drives for paper conveyors and their controls.

Fig. 7 is a section taken on line 7—7 of Fig. 6 and looking in the direction of the arrows.

Fig. 8 is a section of one dual gripping mechanism, illustrating associated operating and paper feeding means.

Fig. 9 is a section through the conveyor chain and its support, taken approximately on line A—A of Fig. 1, showing both the upper and lower flight of chain, the pairs of grippers and their respective operating cams in greater detail.

Fig. 10 is a fragmentary side elevation of the driving mechanism for the carbon feed waiting table.

Fig. 11 is a fragmentary section, taken on line 11—11 of Fig. 8, showing the control for head stops cooperating with the paper feed waiting tables.

Fig. 12 is a perspective of a gripper head or assembly.

For purposes of convenient illustration, the central or main conveyor frame is designated 10 and the various feeding stations are designated A. B. C. D, E, and F in Figure 1 of the accompanying drawing. A roll of web material 50, such as carbon paper, is mounted beneath the frame 10, and portions of predetermined length or size are cut off and supplied in predetermined order from the roll feeding station 58.

The main conveyor 12 is supported on frame 10 and may comprise a chain or belt mounted on drive pulley 14 and idler pulley 15 mounted at the lower and upper ends of the frame, respectively, and is powered by motor 16, and belt 17 as shown in Figures 1, 2 and 3.

A series of gripper members 90—91 and other auxiliary elements are carried by conveyor chain 12, that operate to take or grab individual sheets of carbon paper or similar material supplied from web feeding station 58 shown as mounted beneath frame 10, and alternate sheets of paper or printed forms supplied at timed intervals by sheet feeding stations A to F, shown as mounted above frame 10. These sheets, when engaged by the gripper fingers, are dragged along in pairs by the gripper members 90—91 bearing on the same gripper-bar rest 100 until released over the receiving station 18, where they are formed into sets or groups, with a carbon sheet between each two sheets of paper. In this manner each sheet of paper supplies stability for each sheet of carbon during the handling of the sheets from the feeding stations to the receiving station.

For assembling or gathering together of a predetermined number of plain paper sheets or printed forms having sheets of carbon paper interposed between each two sheets of the predetermined number, for example, carbon paper is first withdrawn from web roll 50 under control of tensioning device 52 and is supplied by feeding station 58 to web feeding station assembly 64 where it is separated by cutter means 66—67 into sheets of predetermined lengths. This carbon sheet is then supplied to a position adjacent to the travel of the gripper bar head guides carried by the conveyor chain 12 where it is engaged by the short or first sheet grippers 90 and held in place between these grippers and gripper-bar rest 94. The sheet of carbon is then dragged by the conveyor chain 12 around to one of the feeding stations, for example station A, where a plain cover sheet or printed form is supplied from waiting table 22 in a similar manner to a position adjacent to the gripper rest 100 where it is then engaged between the second or longer grippers 91 and gripper bar rest 94 engaged by grippers 90. When the cover sheet is supplied from the waiting tables to a position to be engaged by the longer grippers 91, it rides up on gripper fingers 90 that are holding the carbon sheet in place with one edge against gripper rest 100 (Fig. 8).

These grippers 90 and 91 then carry the pair of carbon and plain or printed form sheets with one edge against or adjacent to gripper rest 100 (Fig. 8) along to a position just over hopper or receiving station 18 beneath the upper ends of frame 10 before being released by stripper fingers 116, and are prevented during their travel from taking on additional plain sheets or printed forms at stations B to F because of the closed position of head stop pins 111 (as shown in Fig. 8). When the second sheet of carbon is fed from the roll feeding station 58, it is similarly engaged by a set of grippers 90 and carried past station A to station B where grippers 91 engage another plain sheet or printed form, and the two sheets are then carried past feeding stations C to F and thence to a position to be released into receiving station 18 in the same manner as the previous pair of sheets.

Some of the details of one of the series of sheet feeding stations A to F are more fully shown in Figs. 6 and 8. Each of these feeding stations A to F is of identical construction and preferably include a conveyor-type platform or the like having a width comparable to that of the central or main conveyor 12, and sufficiently long to hold and support a reasonable supply of paper sheets to be assembled or gathered together. Each of these sheet-feeding means or stations also preferably has two parts, namely, the sheet pile conveyor portion 20, and the sheet waiting or resting table 22 (Figs. 1, 5 and 6). It is from the supply maintained on the sheet pile conveyor 20 (preferably in fanned-out order) that the individual sheets are fed intermittently and moved along through the timing means so that the top sheet by its extended and lead edge becomes the preselected sheet to enter onto the sheet waiting or resting table 22 until it is taken by the grippers and dragged away by conveyor 12. The sheet pile conveyors 20 for the sheet-feeding stations are preferably driven and operated by power means 26 and worm gears 28 (Figs. 2, 6 and 7) and these may be and preferably are separate and independent from power means 16 but timed to operate synchronously therewith.

The front or second part of the sheet-feeding stations, as previously indicated, form sheet-waiting or resting tables 22, comprising driven roll 44 and idler roll 46 which support a plurality of conveyor tapes, each of which may have similar and uniform half-twists, so that the rollers serve as long conveyors for controlling the movement of the sheets. These tapes travel toward the main conveyor 12, and tend to hold the waiting sheets in place and in proper register so as to be taken and held by the grippers 91. The half-twists of the tapes (Figs. 2 and 4) serve to maintain the sheets of paper against a common edge as is conventional in sheet feeding equipment.

Waiting tables 22 may be operated by a sprocket 45, and geared to perform synchronously with main conveyor 12 by means of a chain or belt drive 47 between the sprocket 45 and roller 44. Friction drive wheel 24 for feeding sheets from table 20 to waiting table 22 may in turn be operated from pulley 44 by belt or other driving means. Vacuum or other means for feeding the sheets may be applied.

The sheet forwarding means of the several sheet-feeding stations may also be geared or driven by a separate motor provided with an electric-eye switch for controlling the starting and stopping of the motor. As an alternative, the conventional trigger or hair-type or similar switch may be used. In any case the switch should be adapted to be activated by the absence of a sheet of the material on the waiting table. In the event of processing preprinted or marked sheets, the same electric-eye control may be utilized as a means of stopping the entire machine if an unprinted or unmarked sheet passes over it. Under some conditions of operation, two electric-eye control means or a combination of two types of switches may be desirable, one for forwarding the sheet from the feeding station, and one to detect two or more sheets (e. g., one for blanks and one for double thickness of sheets).

Immediately in front of, or directly above or behind the front or idler roller 46 of table 22 a set of tongues 36 may be provided (Figs. 1, 5 and 8), together with head stops 111 which are adapted to open just before the grippers take or grab the sheet of material, and to close immediately after the sheet leaves the waiting table and just before the next sheet arrives. The opening and closing of these head stops is controlled by pins 114 carried by pivoted bar or rocker shaft 110, and the pins are operated by cams 115 on the main conveyor (Figs. 8 and 9).

To facilitate the supply of carbon web or similar material to roll-feeding station 58, which may be located parallel to either side of the flat surface table means supporting the main conveyor means as before described, a roll of web material 50 is provided, which may be positioned parallel to the main table means as shown in Figure 1 or 5 so that the material or web may be unwound from the roll and drawn through the series of guide and tensioning rolls to the feeding station 58. Along this travel of the web from the roll 50 to roll-feeding station 58, means 54 is provided for applying adhesive along a portion of the surface of the web material, preferably in the direction of the web travel, for adhering or attaching to adjacent sheets of paper or other material. Also, the adhesive may be applied to any other part of the web. The adhesive may be activated at or adjacent to receiving station 18 by heat, pressure, or chemical means. The web material at this point may also be perforated or otherwise treated or marked in one way or another on one or both sides. Web tensioning or web slack control means may likewise be provided elsewhere along this travel of the web or in conjunction therewith.

In conjunction with receiving station 18, a hot plate 120 (Fig. 1), or other adhering means (including pressure), may be provided. Such a device may be secured to one or more sides of the stacker for the purpose of activating thermosetting or heat-sealing the adhesive previously applied to certain areas on either one or two sides of all of or certain selected sheets of the material in such manner that the sheets are secured and bound together at one edge in a unitary set, packet, or group. The application of the adhesive is not limited to a part of the traveling web, but may be applied over the entire width and length of one or both sides of the web. The adhesive may also be in the form of a lacquer, varnish, or the like.

The web 56 may be fed or delivered in various ways by a low speed, electric motor 80, preferably geared to the web forwarding means 64 by a worm gear 82 or similar adequate means. The operation of the motor may be and preferably is controlled by an electric-eye device 78 located at a point on the gathering or assembling machine so as to provide adequate timing means for the motions or movement of the web, as shown by Fig. 5. The electric eye, when thus located and properly adjusted, may also serve as a means for measuring or determining the length of sheet to be made or cut from the web. The sheet may be increased or decreased in length according to the position or location of the electric eye within the roll-sheet waiting table means 60.

As shown in Figs. 1, 3, and 5, electric eye 78 is connected to operate synchronously with motor 80 in supplying the web material through a set of feed rolls, the lower two of which are driven by worm gear 82 operating through gear shaft 86, while the two upper rolls are mounted on idler shafts 87—88.

The roll-sheet feeding or resting table means 60 may be operated or driven by a gear connection with the central chain or belt conveyor. Other features and operations are similar to those of the sheet-feeding waiting station or means A to F, except that the head guides are in front of or forward of the front tape conveyor roller and are constructed to open and close from underneath the waiting station tongues and preferably away from the central chain or belt conveyor.

From the previous descrption of roll feeding station 58, it will be seen that predetermined lengths of carbon are cut off by knife 66 operating against stationary member 67 by means of pivotally mounted rocker assembly 68 which also controls the position of head guide 72. The rocker assembly is actuated and controlled by timing wheel 71 which is driven synchronously with driving pulley 14.

Rocker arm assembly 68 is pivotally mounted and connected by link 69 to pivotally mounted arm 70 actuated by timing wheel 71 for operating knife 66—67 only when head guide 72 is open. For properly operating head guide 72, wheel 71 is timed to one-sixth (1/6) the speed of travel of sprocket shaft 14. Timing wheel or cam 71 is provided with a series of sockets, or high and low surfaces spaced around its periphery so as to accommodate the pin or follower carried by arm 70 to produce oscillations at predetermined intervals.

The number of such sockets or the like on the track of the timing wheel 71 depends on the number of sheets of paper or printed forms to be supplied without interruption, or the number to be supplied for assembling into a single group from stations A to F, with one carbon between each two sheets. As illustrated here, provision is made for the omission of every sixth carbon in the gathering together of a packet or group of six sheets from stations A to F.

In Fig. 5, a cut sheet of carbon is shown held in position on the tapes and ready to be taken by the grippers except for head guide 72, and 56b is a waiting sheet about to be cut by knife 66—67. Simultaneously with the release of sheet 56a from the waiting table, the next sheet 56b will be cut by knife 66—67. This sheet 56b will then be delivered to the position on the waiting table just vacated by sheet 56a.

Grippers 90—91 are mounted on shafts 96—98 carried by main conveyor 12 as shown in greater detail in Figs. 8–9. The gripper shaft assembly 92, including gripper bar 94, and gripper rest 100 may comprise as many as three shafts coupled together and secured to or engaged by main conveyor 12 in any suitable manner.

The first sheet gripper shaft 96 and the second sheet gripper shaft 98 are preferably in a plane adjacent to but spaced from the plane of the gripper bar 94 (as shown in Figs. 9 and 12), so that the grippers may open and close in an arc not less than the height of the gripper-bar head stops. Also a plurality of the gripper shaft and bar assemblies, in uniformly spaced relation, may be provided along the entire length of the main conveyor, with each gripper-bar assembly timed to take or grab a sheet of material from a designated or predetermined feeding station.

Grippers 90—91, normally hold the fingers on the gripper rest 100. It should be noted that these grippers in their cooperative relationship, operating as they do from separate gripper shafts, perform a unique function. Each set of grippers is capable of engaging or holding a separate sheet on the same or single gripper-bar rest. It should be noted also that while the sheets arrive at or are placed on the gripper-bar rest at different time intervals, both are released and deposited into the receiving station 13 simultaneously. The first and second-sheet grippers are similar except the second-sheet grippers may be longer than the first-sheet grippers and/or of somewhat greater radius.

The grippers 90—91 of assembly 92 are finger-like members secured to and operated by gripper shafts 96—98 and springs 105 which cause the grippers to securely hold the sheet on the gripper rest 100 and also to open or otherwise release the sheet at a predetermined time as hereinbefore described.

Any one of these gripper-bar assemblies may be rendered inactive by mechanism provided for that purpose. For example, tumbler pins 106—107 (Figs. 8 and 12) operated by cams 104, supported by brackets 103, perform an important function in the method and operation of the apparatus of this invention. When it is desired to omit the pick-up of a sheet at any particular station the tumbler pin is removed from the sheet-gripper shaft, or the gripper is otherwise rendered inactive, such as by manipulating the head stops. This feature is important because it results in the sheet-waiting station being selective and permits cancelling out or omitting the pick-up or selection of a sheet from any particular sheet feeding station.

As shown and described herein, the central or main conveyor means 12 comprises preferably a chain or belt along each linear edge or side of the inclined table or frame 10 and mounted with the necessary pulleys 14—15 to insure circulation up, over and under the main frame. While this frame 10 may be in the nature of a stationary cam means, parts of it may be movable or provided motion or serve as a track on which the conveyor chain may travel as shown in Fig. 9.

While 10 carries or supports main conveyor 12, this structure also serves to correlate the performance of many other parts or essential features of the combination when secured or attached thereto and timed or geared for synchronized operation therewith. This is particularly true of receiving station 13 and the various feeding stations A to F and 59 (both sheet and roll). It is to be understood that all or any part of these sections may be powered by, or geared or timed with, the central or main conveyor chain so as to insure the synchronized operation contemplated herein.

The perimeter of the receiving station 13 may be box-like in its general design (Figs. 1 and 3) and of a size fractionally larger in each direction than the perimeter of the sheets of material to be deposited therein so as to serve as a mechanical stacking means. Registering and aligning the sheets properly, one with the other, may be accomplished by various means including vibration. To insure improved registration or alignment of the sheets of material at any two predetermined or selected right angle edges of the sheets, the receiving or stacking means may be provided with a sloping bottom preferably at an angle of about 45° in two directions as is common in mechanical joggers.

While other embodiments and modifications will become apparent within the scope and spirit of the foregoing, it is to be understood that the invention is not to be limited except as indicated in the following patent claims.

I claim:

1. In a collating machine, a conveyor for gathering sheets severed from a web material and sheets of another material, for assembling in manifold order, a plurality of gripper-bar rests in spaced relation carried by said conveyor, groups of grippers mounted on said conveyor to seat on said rests, certain of the grippers of a group positioned and operated for engaging and holding a sheet severed from the web material, and other grippers of said group mounted to seat on the same rests as the first-named grippers, for engaging and holding a sheet of the other material adjacent to the sheet severed from the web material, a single feeding station for feeding sheets severed from web material at intervals and in succession to a predetermined number of the spaced gripper-bar rests and grippers thereof, and a series of stations for feeding individual sheets of the other material in succession to certain of the gripper-bar rests adjacent to the first-named grippers holding a sheet severed from the web material, in the order that the first of said series of stations operates to feed a sheet to the first of said gripper bars and grippers holding the first of said sheets cut from the web material, and the second of said series of stations operates to feed a sheet to the second gripper-bar rest and grippers thereof, and the third of the series operates to feed a sheet to the third gripper-bar rest and grippers thereof, until each of a predetermined number of the series of stations have supplied a sheet to each of the gripper rests to which a sheet severed from the web material has previously been supplied, a receiving station for said pairs of sheets held by said grippers, and means for releasing each of the pairs of sheets individually and in succession.

2. In a collating machine, in combination, a conveyor, a receiving station for assembled sheets of material, and engaging and holding means in spaced relation on said conveyor, means severing a sheet from web material and feeding said sheet to each of a plurality of said engaging and holding means, and means for feeding a sheet of other material in succession to each of the plurality of engaging and holding means, from one of a plurality of sheet feeding means, to form pairs of sheets consisting of one severed sheet and one of the other sheets, and means for releasing each pair of said sheets independently at the receiving station.

3. In a collating machine, a conveyor for gathering sheets of unstable material and sheets of stable material for assembling in manifold order, and means for operating the conveyor, a plurality of gripper bars arranged in spaced relation on said conveyor and having gripper rests thereon, a plurality of grippers positioned to seat on each of said gripper rests, certain of said grippers adapted to engage and hold a sheet severed from a web of the unstable material, and others of said grippers positioned to seat on the same gripper rest and adapted to engage and hold a sheet of the stable material to form a pair of sheets, means for severing individual sheets of the unstable material, a feeding station positioned to feed said individual sheets of the unstable material at intervals and in succession to said gripper bars in spaced relation, and certain of said grippers thereof, a plurality of feeding stations positioned and timed to operate in succession to feed a sheet of stable material at timed intervals and in spaced relation to a position on said conveyor adjacent to and in alignment with a sheet of said unstable material, that has been fed to said grippers and is held thereby, to form pairs of sheets, a receiving station for said sheets, and means for releasing each pair of sheets individually and in succession at the receiving station.

4. In a collating machine, a conveyor, power means for moving the conveyor, a plurality of gripper bars arranged in spaced relation on said conveyor and having gripper rests thereon, a plurality of grippers positioned to seat on said gripper rests, certain of said grippers adapted to engage and hold a sheet severed from web material, and others of said grippers positioned to seat on the same gripper rest and adapted to engage and hold a sheet of another material adjacent to the sheet severed from web material to form a pair of sheets, separate means for feeding the sheets severed from web material and the sheets of other material, and means for releasing said pairs of sheets individually.

5. In a collating machine, a conveyor, power means for moving the conveyor, a feeding station position to supply severed sheets from a web of material to the conveyor, means for severing sheets from the web, timing means for operating the severing means and feeding means synchronously with the movement of the conveyor, a plurality of sheet feeding stations adapted to operate in succession to feed a sheet of paper to sheets severed from the web, means for operating said paper feeding stations synchronously with the movement of the conveyor, means carried by the conveyor for engaging and dragging along pairs of sheets comprising a sheet of severed material and a sheet of paper, a receiving station for a multiplicity of the sheets, and means for releasing the pairs of sheets over the receiving station.

6. In a collating machine, a conveyor for gathering sheets of unstable material and sheets of stable material for assembling in manifold order, and power means for moving the conveyor, a supply of web material, timing means for controlling the feeding of the web material while applying adhesive thereto, and severing it into sheets, a plurality of feeding stations for supplying sheets of paper, grippers carried by the conveyor for engaging the sheet cut from the web material, separate but adjacent grippers for engaging the sheets of paper, a common rest member for the first-named grippers and the adjacent grippers, means for rendering inactive the feeding means of a sheet cut from web material, and separate means for selectively rendering the first-named grippers inactive, means for removing from the conveyor sheets of paper assembled with sheets cut from web material, and means for combining a predetermined number of said sheets into packs.

7. In a collating machine of the class described, in combination, a conveyor for gathering sheets severed from web material and sheets of another material for assembling together in manifold order, means for severing individual sheets from the web material; feeding means for the severed sheets, and holding means carried by the conveyor for engaging an edge of the severed sheet, a plurality of feeding stations in spaced relation adapted to feed a sheet of the other material to a position adjacent to the severed sheet, to form a plurality of pairs of sheets in spaced relation, consisting of a severed sheet and another sheet, and means adjacent the holding means for each severed sheet for engaging and holding an edge of the sheet of other material while said sheets are dragged along to the receiving station, and means for releasing the adjacently held sheets simultaneously.

8. The invention of claim 4 including means for rendering the first-feeding station inactive to omit a sheet severed from web material in order to form a pack having one less sheet cut from the web than there are sheets of the more stable material.

9. In a collating machine for forming sheets of material into packs, a conveyor mounted to operate in an inclined plane, means for moving the conveyor over an endless path, a plurality of sheet feeding stations positioned to supply sheets of paper to the conveyor in timed relation with the movement of the conveyor, a web feeding station including severing and feeding means positioned and constructed to supply individual sheets to the conveyor severed from the web in timed relation with the movement of the conveyor in advance of feeding the sheets of paper, groups of grippers in spaced relation carried by the conveyor, a common gripper rest for each of the groups of grippers, certain of the grippers of a group positioned and operated for engaging a sheet severed from the web material, while other grippers of said group engage a sheet of paper on the same gripper rest, and means for collecting and assembling a predetermined number of the sheets into a pack.

10. In a collating machine, a conveyor for gathering sheets severed from web material and sheets of another material for assembling together, separate means for feeding the severed sheets of material and sheets of the other material to the conveyor, sets of grippers having a common gripper rest for each set for engaging the sheets of material, certain of the grippers of said sets positioned and constructed to engage the severed sheet and others positioned and constructed to engage the other sheet, and means for releasing the grippers and removing the sheets at the assembly point.

11. In a collating machine, a conveyor for gathering sheets of unstable material and sheets of stable material for assembling in manifold order, means for feeding to the conveyor a sheet of the unstable material, and separate means for feeding to the conveyor a sheet of the stable material, sets of grippers mounted on the conveyor, a common gripper rest for each set of grippers, means for opening each set of grippers at a predetermined point in the movement of the conveyor, means for closing certain of the grippers on one edge of a sheet of the unstable material, means for closing other grippers of said set on one edge of a sheet of the stable material, and means for releasing the grippers and removing the sheets at the assembly point.

STANLEY R. RINEHART.

REFERENCES CITED

The following references are of record in the file of this patent:

UNITED STATES PATENTS

| Number | Name | Date |
| --- | --- | --- |
| 805,099 | Sage | Nov. 21, 1905 |
| 2,144,331 | Fulk | Jan. 17, 1939 |
| 2,218,217 | Potdevin | Oct. 15, 1940 |
| 2,255,777 | Jones | Sept. 16, 1941 |
| 2,260,540 | Schramm | Oct. 28, 1941 |
| 2,534,070 | Schmidt | Dec. 12, 1950 |